United States Patent
Honme

(10) Patent No.: US 7,439,980 B2
(45) Date of Patent: Oct. 21, 2008

(54) IMAGE PROCESSING METHOD AND APPARATUS

(75) Inventor: Mitsuhiro Honme, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 304 days.

(21) Appl. No.: 11/070,941

(22) Filed: Mar. 3, 2005

(65) Prior Publication Data

US 2005/0195207 A1   Sep. 8, 2005

(30) Foreign Application Priority Data

Mar. 8, 2004   (JP) ............................. 2004-063889
Mar. 10, 2004  (JP) ............................. 2004-067348

(51) Int. Cl.
    *G00T 15/00*   (2006.01)

(52) U.S. Cl. .................. 345/530; 345/531; 345/619; 345/640; 345/443

(58) Field of Classification Search .......... 345/530, 345/531, 629, 619, 640, 443
    See application file for complete search history.

(56) References Cited

U.S. PATENT DOCUMENTS

| | | | | |
|---|---|---|---|---|
| 5,029,106 A | * | 7/1991 | Kai et al. | 345/443 |
| 5,625,764 A | * | 4/1997 | Tsujimoto et al. | 345/640 |
| 6,720,976 B1 | * | 4/2004 | Shimizu et al. | 345/629 |

FOREIGN PATENT DOCUMENTS

| | | |
|---|---|---|
| JP | 62-285188 | 12/1987 |
| JP | 04-175887 | 6/1992 |

* cited by examiner

*Primary Examiner*—Phu K Nugyen
(74) *Attorney, Agent, or Firm*—Pillsbury Winthrop Shaw Pittman LLP

(57) ABSTRACT

In image processing adapted to a display apparatus using a plurality of line buffers for storing data regarding dots aligned on scanning lines on the screen, when a line having a prescribed width and a prescribed length is drawn on the screen, a line drawing range is calculated with reference to start-point coordinates and end-point coordinates as well as the width of line, thus selecting dots on the screen with reference to coordinates of intersections between the scanning lines and the boundaries of the line drawing range, wherein data regarding the selected dots are written into at least one of the line buffers. In line terminating processing, a virtual circle whose diameter matches the width of the line is imaginarily drawn at one end of the line, so that data regarding dots belonging to the virtual circle are written into at least one of the line buffers.

8 Claims, 14 Drawing Sheets

| 4: MONITOR | 20a: LINE BUFFER | 20b: LINE BUFFER |
|---|---|---|
| LINE 0 | WRITE LINE 0 | — |
| LINE 1 | DISPLAY LINE 0 | WRITE LINE 1 |
| LINE 2 | WRITE LINE 2 | DISPLAY LINE 1 |
| LINE 3 | DISPLAY LINE 2 | WRITE LINE 3 |
| ⋮ | WRITE LINE 4 | DISPLAY LINE 3 |
| ⋮ | ⋮ | ⋮ |
| LINE N-3 | DISPLAY LINE N-3 | WRITE LINE N-2 |
| LINE N-2 | WRITE LINE N-1 | DISPLAY LINE N-2 |
| LINE N-1 | DISPLAY LINE N-1 | WRITE LINE N |
| LINE N | — | DISPLAY LINE N |

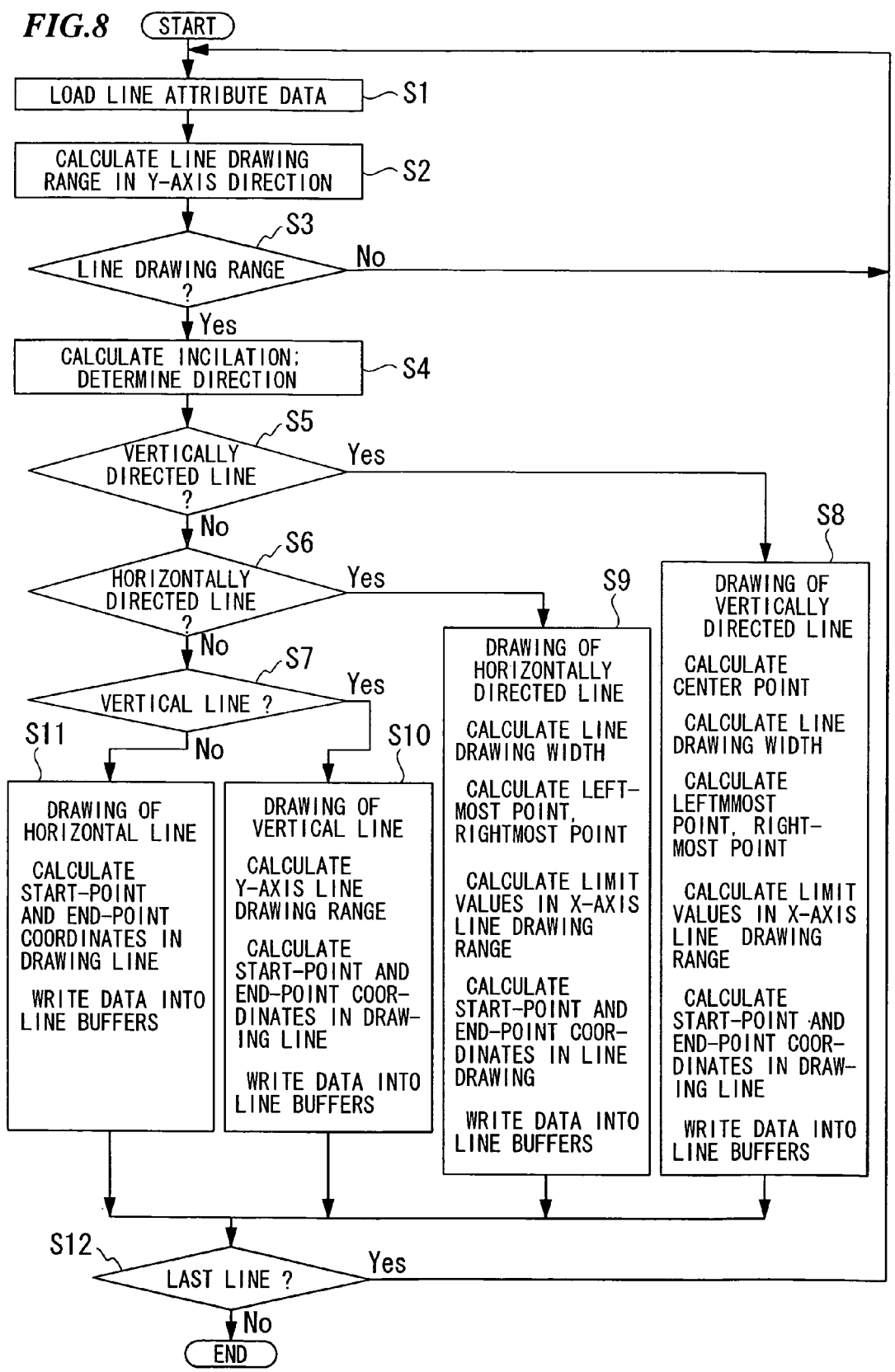

EVEN-NUMBERED WIDTH (LSX, LSY) or (LEX, LEY)
X: DRAW REFERENCE POINT

ODD-NUMBERED WIDTH (LSX, LSY) or (LEX, LEY)
X: DRAW REFERENCE POINT

*FIG.21A* *FIG.21B*
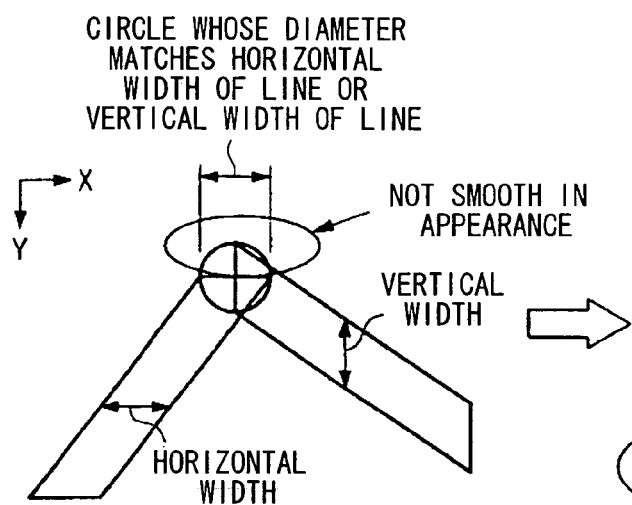
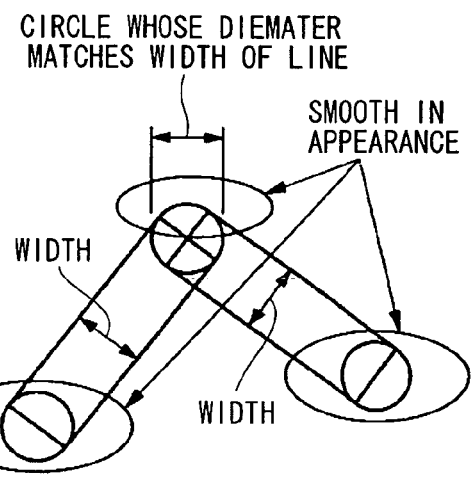

IMAGE PROCESSING METHOD AND APPARATUS

BACKGROUND OF THE INVENTION

1. Field of the Invention

This invention relates to image processing methods and apparatuses that process image data representing lines having prescribed lengths and widths displayed on monitor screens.

This application claims priority on Japanese Patent Applications Nos. 2004-63889 and 2004-67348, the contents of which are incorporated herein by reference.

2. Description of the Related Art

Conventionally, various kinds of software programs have been developed to display a plurality of lines (or line segments) having prescribed lengths and widths on screens of monitors (or displays), wherein start-point coordinates and end-point coordinates of lines as well as widths of lines are designated by central processing devices (CPUs) to produce three data therefor, which are converted into dot data and are then written into frame buffers having storage capacities, which correspond to numbers of dots displayed on two-dimensional flat screens of monitors. Then, dot data stored in frame buffers are supplied to monitors (such as liquid crystal displays) so as to display lines on screens, wherein double-buffer configurations are arranged to realize read/write operations regarding dot data. This technology is disclosed in Japanese Patent Application Publication No. H04-175887, for example.

Normally, image processing apparatuses are each constituted by LSI devices, wherein frame buffers are incorporated into chips of LSI devices. However, fame buffers have relatively large storage capacities, which require relatively large chip areas. For this reason, it is preferable for image processing apparatuses not to incorporate frame buffers but to incorporate line buffers, each having a relatively small storage capacity corresponding to a limited number of dots on a single (horizontal) scanning line, in consideration of manufacturing costs and sizes, which should be reduced.

However, it takes a relatively long time to convert three pieces of data, representing start-point coordinates and end-point coordinates of lines as well as widths of lines, into dot data. Such processing executed by conventional line buffers having limited capacities may fail to precisely display lines having prescribed lengths and widths on monitor screens.

For example, a conventionally known image processing apparatus displays a line having a prescribed width, wherein a start-point terminal and an end-point terminal lie in parallel with or lie perpendicular to horizontal scanning lines on the monitor screen as shown in FIG. 19. This makes it very difficult to display a line having a prescribed width whose start-point terminal and end-point terminal lie perpendicular to the length direction as shown in FIG. 20.

When lines having prescribed widths are drawn without performing circular terminating processes on end portions thereof, end portions of lines should be deteriorated in appearances on monitor screens. In particular, when two lines are drawn to connect together on the monitor screen, they cannot be connected smoothly at the connecting area therebetween. Japanese Patent Application Publication No. S62-285188 teaches a solution to this problem, in which as shown in FIG. 21A, in which a circle is drawn at the connecting area between two lines, thus realizing smooth connection therebetween.

The aforementioned process is performed in such a way that a circle whose diameter matches the horizontal width of a line, which lies in parallel with horizontal scanning lines on the monitor screen, or the vertical width of a line, which lies perpendicular to horizontal scanning lines on the monitor screen, is drawn in the connecting area at which two lines are connected together. This causes a problem in that the diameter of the circle becomes greater than the horizontal width of the line or the vertical width of the line, whereby two lines cannot be connected smoothly on the monitor screen. In addition, the aforementioned circular terminating process is performed with respect to the connecting area, which is detected between two lines and in which a circle is drawn. That is, other ends of lines cannot be made smooth in appearance on the monitor screen. In addition, the circular terminating process requires a relatively great burden of load in the circuitry for automatically discriminating the connecting area between two lines.

SUMMARY OF THE INVENTION

It is an object of the invention to provide an image processing method and an image processing apparatus, which allow lines having prescribed widths to be displayed on the monitor screen by use of line buffers in such a way that start-point terminals and end-point terminals of lines are drawn perpendicular to length directions of lines.

It is another object of the invention to provide an image processing method and an image processing apparatus, which produce smooth connecting areas drawn between lines and which make other ends of lines smooth in appearance on the monitor screen.

In a first aspect of the invention, an image processing method adapted to a display apparatus using a plurality of line buffers for storing data regarding dots aligned on scanning lines displayed on the screen is realized by a first step for calculating a line drawing range of a line that is displayed on the screen, which lies in a vertical direction of the screen, wherein the line has a prescribed width and a prescribed length defined between start-point coordinates and end-point coordinates within the line drawing range, so that dots not belonging to the line drawing range are not displayed on the screen; a second step for selecting dots on scanning lines to be displayed on the screen with reference to coordinates of intersections between the scanning lines and boundaries of the line drawing range; and a third step for writing data regarding the selected dots on the scanning lines into at least one of the line buffers.

In a second aspect of the invention, an image processing method adapted to a display apparatus using a plurality of line buffers for storing data regarding dots aligned on scanning lines displayed on the screen is realized by a first step for calculating a line drawing range of a line that is displayed on the screen, which lies in a vertical direction of the screen, wherein the line has a prescribed width and a prescribed length defined between start-point coordinates and end-point coordinates within the line drawing range, so that dots not belonging to the line drawing range are not displayed on the screen; a second step for calculating the inclination of the line based on the start-point coordinates and end-point coordinates; a third step for when the inclination of the line ranges from 45° to 135° against each of the scanning lines, calculating center coordinates at which a scanning line intersects with the center of the line so as to produce a scanning-direction length of the line based on the start-point coordinates and end-point coordinates as well as the width of the line within the line drawing range, thus calculating coordinates of intersections between the scanning lines and the boundaries of the line drawing range on the basis of the center coordinates and scanning-direction length of the line; a fourth step for when the inclination of the line ranges from 0° to 45° or ranges from 135° to 180°, calculating a scanning-direction length of the line based on the start-point coordinates and end-point coordinates as well as the width of the line within the line drawing range, thus calculating coordinates of intersections between the line and the boundaries of the line drawing range on the basis of the start-point coordinates and end-point coordinates as well as the width of the line; a fifth step for selecting dots to be displayed on the screen with reference to the coordinates of intersections; and a sixth step for writing data regarding the selected dots on the scanning lines into at least one of the line buffers.

In the above, the image processing method further includes a seventh step for making a decision as to whether or not line terminating processing is performed on at least one end of the line displayed on the screen; and an eighth step for in the line terminating processing, calculating limit values for dots displayed on the screen on the basis of at least one of the start-point coordinates and the end-point coordinates of the line, whereby prescribed dots ranging between the limit values are written into at least one of the line buffers so as to prevent other dots not ranging between the limit values from being written into at least one of the line buffers.

In a third aspect of the invention, an image processing method adapted to a display apparatus using a plurality of line buffers for storing data regarding dots aligned on scanning lines displayed on the screen is realized by a first step for when a line having a predetermined width and a predetermined length is drawn on the screen, detecting dots belonging to a virtual circle, which is drawn at one end of the line and whose diameter matches the width of the line; and a second step for writing data regarding the detected dots into at least one of the line buffers.

In a fourth aspect of the invention, an image processing method adapted to a display apparatus using a plurality of line buffers for storing data regarding dots aligned on scanning lines displayed on the screen is realized by a first step for reading line attribute data representing attributes of a line, having a prescribed width and a prescribed length, to be drawn on the screen from a storage device; a second step for making a decision as to whether or not the line attribute data designate line terminating processing to be performed on at least one end of the line; in a third step for in the line terminating processing, detecting dots belonging to a virtual circle, which is drawn at one end of the line and whose diameter matches the width of the line; and a fourth step for writing data regarding the detected dots into at least one of the line buffers.

In the above, dots are detected based on the line attribute data designating the line terminating processing with reference to start-point coordinates or end-point coordinates of the line. In addition, dots are detected based on area ratios, each of which is calculated with reference to a boundary of the virtual circle drawn at one end of the line.

BRIEF DESCRIPTION OF THE DRAWINGS

These and other objects, aspects, and embodiments of the present invention will be described in more detail with reference to the following drawings, in which:

FIG. 8 is a flowchart showing details of a line drawing step shown in FIG. 7;

FIG. 21A shows two lines that are connected together at a connecting area therebetween by drawing a circle whose diameter matches the horizontal width of a line or the vertical width of a line on a monitor screen; and FIG. 21B shows two lines that are connected together smoothly at a connecting area therebetween by drawing a circle whose width matches the width of a line.

DESCRIPTION OF THE PREFERRED EMBODIMENT

This invention will be described in further detail by way of examples with reference to the accompanying drawings.

Figure 2:
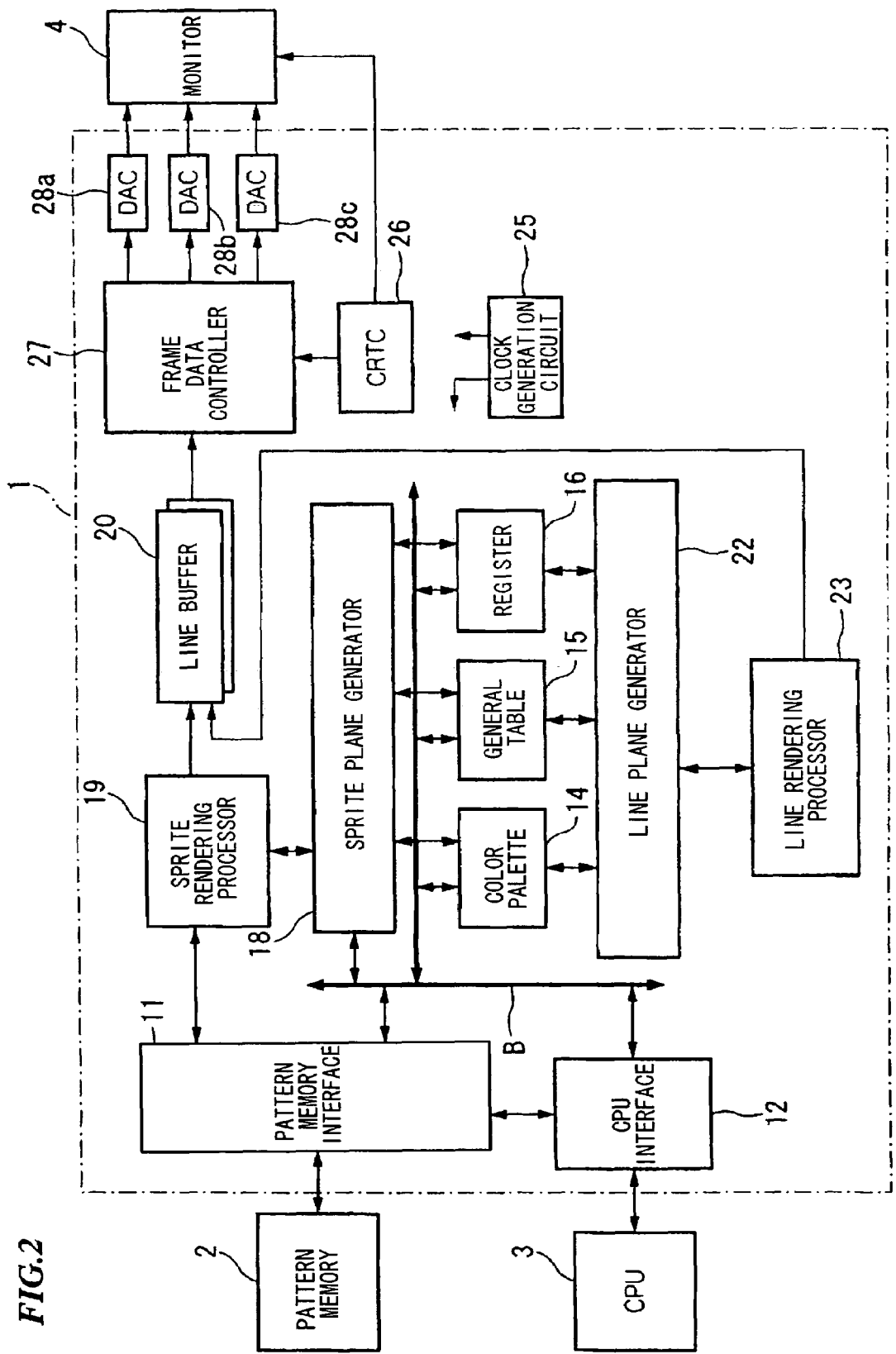
FIG. 2 is a block diagram showing the constitution of a display apparatus incorporating the image processing device shown in FIG. 1.

FIG. 2 is a block diagram showing the constitution of a display apparatus incorporating an image processing device 1 using line buffers in accordance with a preferred embodiment of the invention, wherein reference numeral 2 designates a pattern memory for storing sprite patterns; reference numeral 3 designates a central processing unit (i.e., a CPU) for controlling image display processes; and reference numeral 4 designates a monitor using a cathode-ray tube (i.e., a CRT).

In the image processing device 1, reference numeral 11 designates a pattern memory interface; reference numeral 12 designates a CPU interface; reference symbol B designates a bus line; and reference numeral 14 designates a color palette for converting color codes into RGB color data (where R, G, and B designate red, green, and blue). The pattern memory 2 stores image data representing sprite patterns in the form of color codes, which are converted into RGB color data by the color palette 14. In addition, reference numeral 15 designates a general table; and reference numeral 16 designates a register (or registers) for temporarily storing data. The CPU 3 writes data into the general table 15, which has a layer setup table 15a and a line attribute table 15b as shown in FIG. 3.

Figures 4, 5:
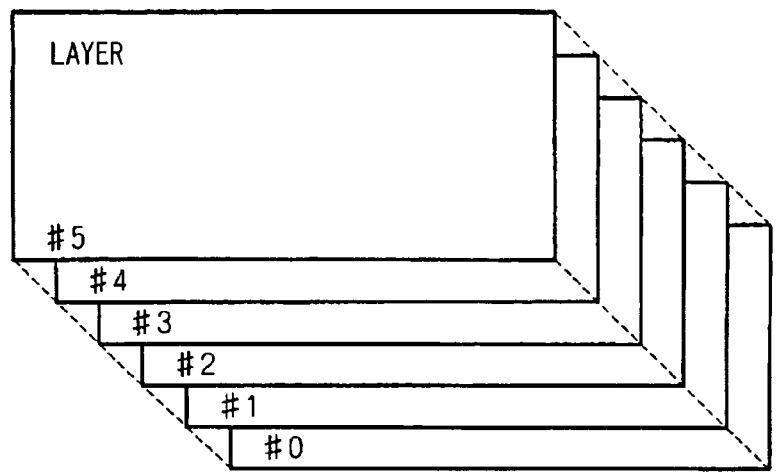
FIG. 4 shows the overall layout for layers whose contents are written over each other.
FIG. 5 shows relationships between lines displayed on a monitor screen and contents of line buffers having write/display functions shown in FIG. 1.

The layer setup table 15a is constituted by a plurality of layers. FIG. 4 shows the overall layout for layers #0 to #5, wherein the layer #0 is written first, then, other layers #1, #2, . . . are sequentially written over. Each of the layers corresponds to a sprite display layer or a line display layer. The sprite display layer describes sprite attribute data. The line display layer describes a start-point address and an end-point address with respect to each of lines #0, #1, . . . listed in the line attribute table 15b. As sprite attribute data, it is possible to list identification numbers of sprites, display position data for designating display positions, and rendering data for designating magnification and reduction of images on the monitor screen. The line attribute table 15b describes various attributes of lines, i.e., start-point coordinates and end-point coordinates of lines, widths of lines, and colors of lines as well as start-point circle drawing data for designating circles whose diameters match widths of lines to be drawn at start-points of lines, and end-point circle drawing data for designating circles whose diameters match widths of lines to be drawn at end-points of lines.

Figure 3:
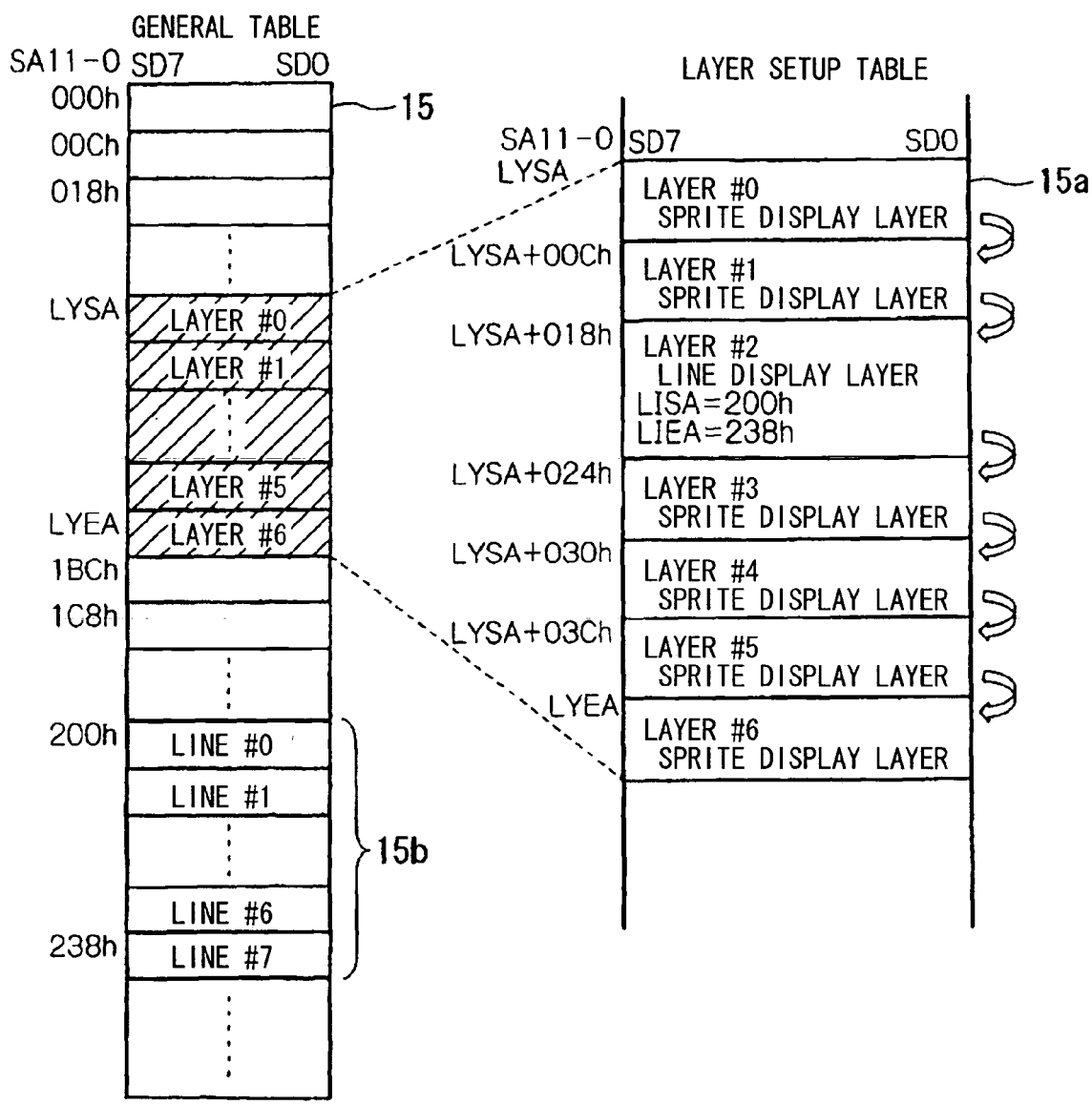
FIG. 3 shows the stored contents of a general table incorporated in the image processing device shown in FIG. 2.

In FIG. 3, the layer setup table 15a describes seven layers #0 to #6, wherein the layer #2 corresponds to a line display layer, and other layers #0, #1, and #3 to #6 correspond to sprite display layers, each of which stores attributes regarding a single sprite. The layer #2 describes a start-point address "200h" and an end-point address "238h". In addition, the line attribute table 15b describes attributes regarding eight lines #0 to #7 each designating a start-point address and an end-point address.

In FIG. 2, a sprite plane generator 18 sequentially reads sprite attribute data from the prescribed layers of the layer setup table 15a, wherein it extracts identification numbers of sprites from the read sprite attribute data so as to supply them to the pattern memory interface 11. The pattern memory interface 11 reads image data representing sprite patterns designated by identification numbers from the pattern memory 2, thus supplying them to the sprite plane generator 18. Image data are transferred from the sprite plane generator 18 to the color palette 14, in which they are converted into RGB color data, which are then supplied to a sprite rendering processor 19 together with sprite attribute data.

The sprite rendering processor 19 performs rendering processes (such as magnification, reduction, and rotation based on rendering data) on RGB color data output from the sprite plane generator 18, so that rendering-completed color data are written into line buffers 20. A line plane generator 22 reads the start-point address and end-point address from the line display layer in the layer setup table 15a, whereby it reads line attribute data from the line attribute table 15b based on the read addresses. The read line attribute data are supplied to a line rendering processor 23, wherein color codes for designating colors of lines are converted into RGB color code with reference to the color palette 14.

Based on start-point coordinates and end-point coordinates of lines, widths of lines, start-point circle drawing data, and end-point circle drawing data, all of which are included in line attribute data, the line rendering processor 23 calculates dots incorporated in lines to be displayed on the monitor screen, whereby RGB color data, which are produced by converting color codes included in line attribute data with reference to the color palette 14, are written into the line buffers 20 at prescribed storage positions corresponding to the calculated dots.

There are provided two line buffers 20 each having a plurality of memory slots corresponding to dots on a single horizontal scanning line. The two line buffers 20 alternately serve as a read buffer and a write buffer. A CRT controller (CRTC) 26 generates various pulse signals such as horizontal scanning pulses and vertical scanning pulses for driving the monitor 4 based on clock pulses generated by a clock generation circuit 25, wherein pulse signals are supplied to the monitor 4 and a frame data controller 27. The frame data controller 27 reads color data from the line buffers 20 so as to supply them to digital-to-analog converters (DACs) 28a, 28b, and 28c in synchronization with horizontal scanning pulses. The DACs 28a to 28c convert color data into analog color signals, which are then supplied to the monitor 4.

Next, the outline of line drawing processing using line buffers will be described with reference to FIGS. 1, 5, and 6.

Figure 1:
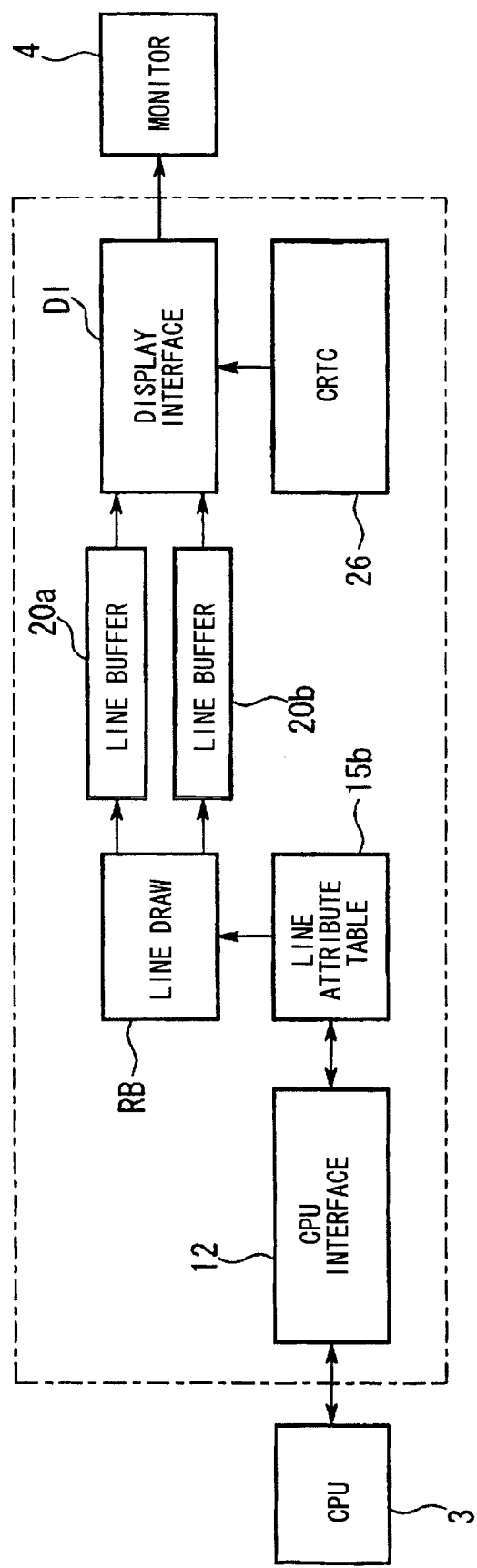
FIG. 1 is a block diagram showing essential parts of an image processing device using line buffers in accordance with a preferred embodiment of the invention.

FIG. 1 is a block diagram showing essential parts of the image processing device, which are extracted from the constitution shown in FIG. 2 in terms of line drawing processing. In order to draw a line on the monitor screen, the CPU 3 sets line attribute data (such as start-point coordinates and end-point coordinates of lines, widths of lines, colors of lines, start-point circle drawing data, and end-point circle drawing data) to the line attribute table 15b. A line drawing block RB, which corresponds to the line plane generator 22 and the lien rendering processor 23 shown in FIG. 2, reads line attribute data, which are set to the line attribute table 15b with respect to lines respectively, wherein it performs calculations regarding display positions by use of attributes of lines, so that color data representing colors of lines, which are designated by line attribute data, are written into line buffers 20a and 20b at prescribed display positions.

A display interface block D1, which corresponds to the frame data controller 27 and the DACs 28a to 28c, reads color data from the line buffers 20a and 20b in synchronization with scan timings that are generated by the CRT controller 26 with respect to the monitor 4, so that the read color data are supplied to the monitor 4 as head data.

The line buffers 20a and 20b construct a double-buffer configuration for realizing writing and displaying functions thereby, wherein they are adequately changed over in writing and displaying functions with respect to each of lines displayed on the monitor screen. As shown in FIG. 5, the line buffers 20a and 20b alternately performs write/display operations with respect to each of lines displayed on the monitor screen. For example, when the line buffer 20a proceeds to displaying line 0, data regarding line 1 are written into the line buffer 20b. At the completion of displaying line 0 on the monitor screen, the line buffers 20a and 20b are changed over in functions thereof, so that data regarding line 1 written into the line buffer 20b is subjected to display. When line 1 is displayed on the monitor screen, data regarding line 2 are written into the line buffer 20a. As described above, the line-buffer display system is advantageous in that it can reduce the total amount of memory capacity compared with the frame-buffer display system, whereas it has a drawback in that parameters regarding previous lines written into line buffers cannot be maintained.

Figure 6:
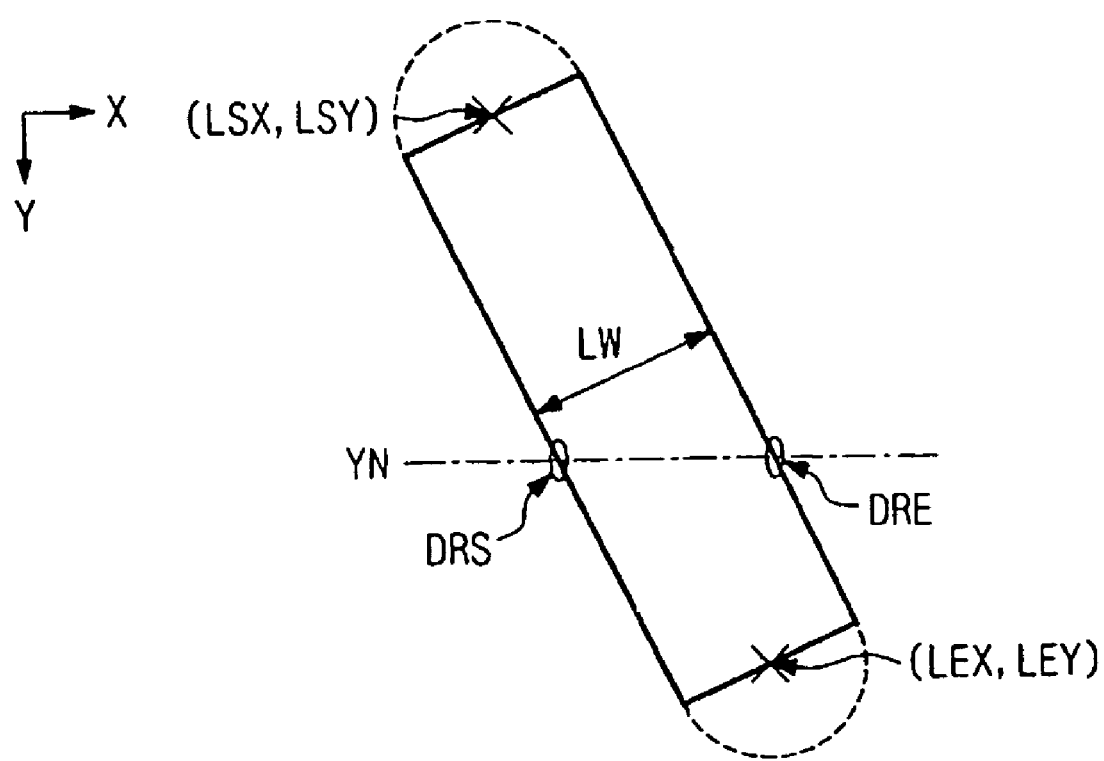
FIG. 6 diagrammatically shows a line having a prescribed width and a prescribed length, which is to be displayed on the monitor screen.

Suppose that as shown in FIG. 6, a line having a width LW is drawn from start-point coordinates (LSX,LSY) to end-point coordinates (LEX,LEY). In the line-buffer display system, it is necessary to calculate coordinates regarding a start-point dot DRS and an end-point dot DRE with respect to each of horizontal lines being drawn on the monitor screen, wherein color data regarding the designated color of a line are written into line buffers at addresses ranging from DRS to DRE. When both the start-point circle drawing data and end-point circle drawing data are set to '1', circles both having the same diameter corresponding to the width LW are supposed to be drawn at the start-point terminal and end-point terminal of the line, wherein color data are written with respect to internal areas of semicircular areas encompassed by dotted curves in FIG. 6.

Next, details of the line drawing processing will be described with reference to FIGS. 7, 8, 9A, 9B, 10, 11, 12, 13, 14, 15, 16, 17A, 17B, 18A, and 18B.

Figure 7:
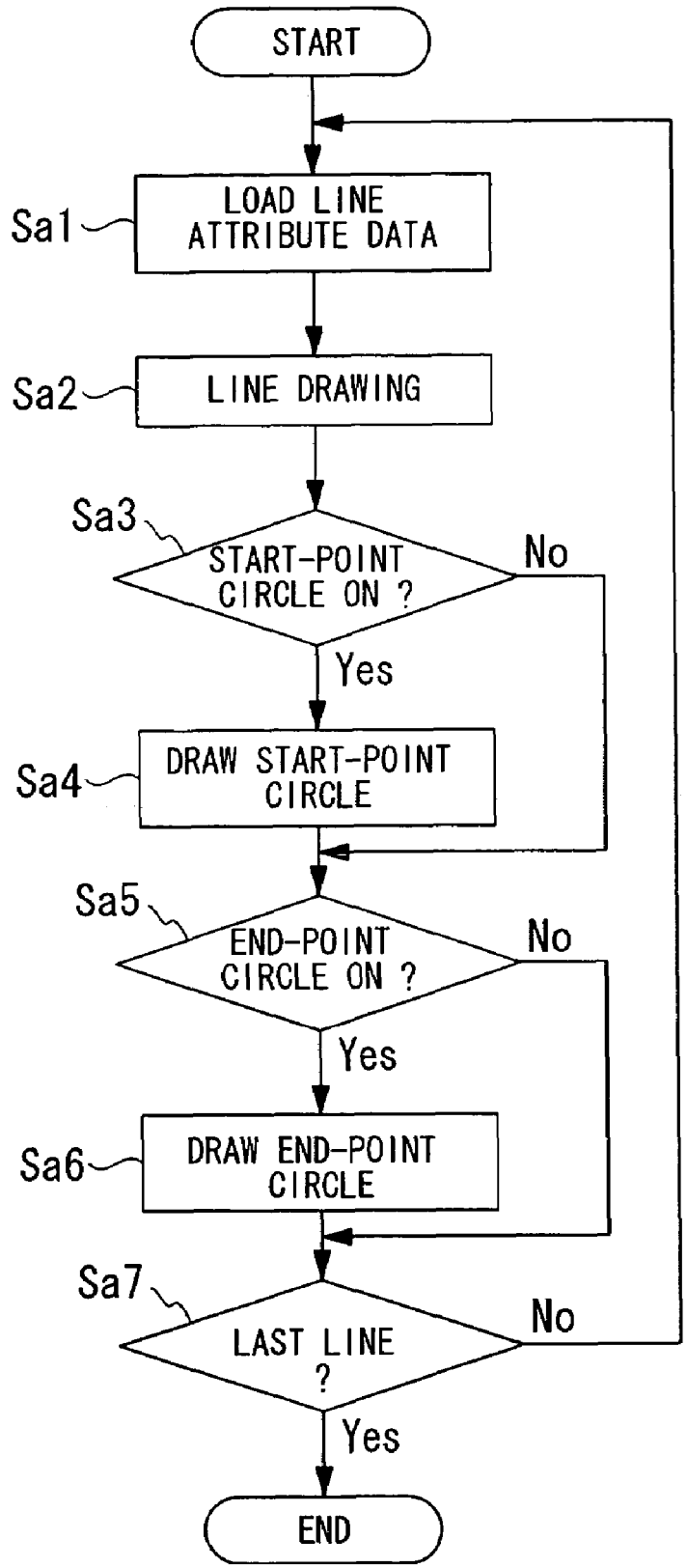
FIG. 7 is a flowchart showing line drawing processing.

FIG. 7 is a flowchart showing steps for the line drawing processing described above. In step Sa1, the line drawing block RB (see FIG. 1) loads line attribute data from the line attribute table 15b. In step Sa2, the CPU 3 performs line drawing operations based on line attribute data except for a start-point circle and an end-point circuit respectively drawn at terminals of a line. In step Sa3, a decision is made as to whether or not line attribute data regarding start-point circle drawing is turned ON (or set to '1'). When a start-point circle is ON, the flow proceeds to step Sa4 so as to proceed to processing for drawing a start-point circle with respect to the line. If it is not ON, the flow proceeds to step Sa5, in which a decision is made as to whether or not line attribute data regarding end-point circle drawing is turned ON (or set to '1'). When an end-point circuit is ON, the flow proceeds to step Sa6 so as to proceed to processing for drawing an end-point circle with respect to the line. If it is not ON, the flow proceeds to step Sa7, in which a decision is made as to whether or not the line presently subjected to line drawing processing designates the last line belonging to the presently processed layer. If so, the CPU 3 ends the line drawing processing shown in FIG. 7. If not, the flow returns to step Sa1 so as to proceed to line drawing processing with respect to the next line.

Figure 9A:
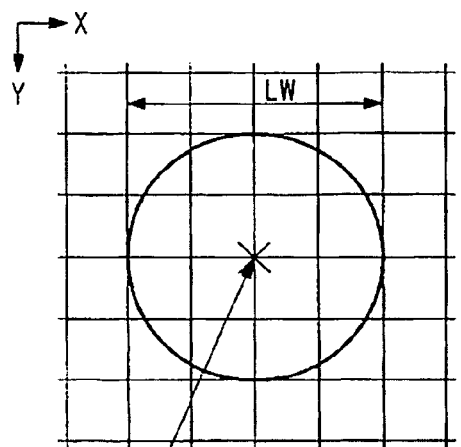
FIG. 9A shows a method how to determine a draw reference point with respect to an even-numbered width of a line drawn on the monitor screen.
Figure 9B:
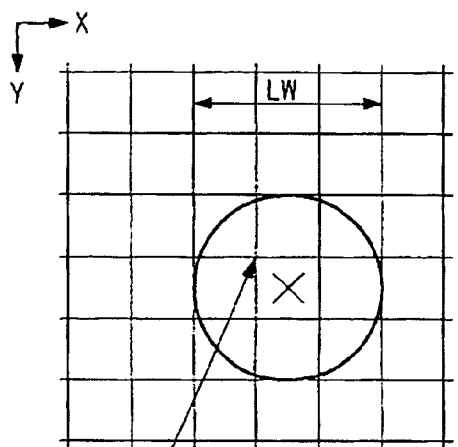
FIG. 9B shows a method how to determine a draw reference point with respect to an odd-numbered width of a line drawn on the monitor screen.

Next, details of the step Sa2 regarding line drawing operations will be described with reference to FIG. 8 etc. FIGS. 9A and 9B show methods how to determine draw reference points. As shown in FIG. 9A, when the width LW of the line is referred to as an even-numbered width (realized by an even number of dots displayed on the monitor screen), start-point coordinates and end-point coordinates on the grid directly show a draw reference point. As shown in FIG. 9B, when the width LW of the line is referred to as an odd-numbered width (realized by an odd number of dots displayed on the monitor screen), start-point coordinates and end-point coordinates on the grid are each added with a value 0.5 in terms of X-axis and Y-axis coordinates so as to produce a draw reference point. The reason why the draw reference point is shifted with respect to the line having the odd-numbered width is to realize smooth drawing of the line to be displayed on the monitor screen. In the following description, start-point coordinates and end-point coordinates are expressed as follows:

Start point (LSX,LSY)
End point (LEX,LEY)

where the origin of the coordinates system matches the upper-left corner of the monitor screen.

Next, detailed descriptions will be given with respect to steps S1 to S12 in the flowchart shown in FIG. 8.

(S1) Load Line Attribute Data

The line drawing block RB (see FIG. 1) sequentially reads line attribute data from the line attribute table 15b before the monitor 4 starts showing scanning lines on the screen. Herein, the line attribute data include start-point coordinates and end-point coordinates of lines, widths of lines, and colors of lines, for example.

(S2) Calculate Drawing Area in Y-Axis Direction

In order to determine whether or not scanning lines (where Y=YN) belong to the internal area of a line to be drawn (i.e., a line drawing range), or whether or not they cross the line to be drawn, a minimal value Ymin and a maximal value Ymax are calculated with respect to the line in terms of the Y-axis direction, wherein they are expressed by different equations in response to the odd-numbered width of the line and the even-numbered width of the line respectively.

Odd-numbered width $Ymin=min(LSY,LEY)+0.5-LW/2$ $Ymax=max(LSY,LEY)+0.5+LW/2$

Even-numbered width $Ymin=min(LSY,LEY)-LW/2$ $Ymax=max(LSY,LEY)+LW/2$

In the above, the function "min(A,B)" indicates smaller one selected between A and B; and the function "max(A,B)" indicates larger one selected between A and B. In addition, the value "0.5" is used to shift start-point coordinates and end-point coordinates as well as the draw reference point in the case of the odd-numbered width of the line shown in FIG. 9B. By shifting them by 0.5, it is possible to reduce the unnatural appearance of the line drawn on the monitor screen.

When scanning lines each belong to the range defined between Ymin and Ymax and also belong to the prescribed line terminal processing range, a decision is made as to whether or not they belong to the line drawing range after executing line terminal processing, as follows:

Odd-numbered width $LSY+0.5-LW/2 \leq YN < LSY+0.5+LW/2$ $LEY+0.5-LW/2 \leq YN < LEY+0.5+LW/2$ Even-numbered width $LSY-LW/2 \leq YN < LSY+LW/2$ $LEY-LW/2 \leq YN < LSY+LW/2$ Incidentally, details of the line terminating processing will be described later.

(S3) Decision as to Line Drawing Range

When scanning lines are each smaller than Ymin with respect to the line drawn on the monitor screen, or when they are each greater than Ymax, they should be out of the line drawing range, so that they are not subjected to draw processing. This is indicated by "NO" in step S3, so that the flow proceeds to processing of the next line. In the case of the line terminating processing range, the line terminating processing is performed; then, a decision is made as to whether or not scanning lines belong to the line drawing range. When it is determined that scanning lines belong to the line drawing range after the execution of the line terminating processing, in other words, when they range between Ymin and Ymax and belong to the inside of the line terminating processing range, in short, when the decision result of step S3 turns to "YES", the flow proceeds to the following steps (starting from step S4).

(S4) Calculation of Inclination, and Determination of Direction

A line is drawn in a direction from its start-point to its end-point on the monitor screen. Therefore, the line drawing method depends on the start-point and end-point of the line, and it also depends on the inclination of the line (represented by a value of |LEX−SLX|/|LEY−LSY|). For this reason, it is necessary to calculate the inclination of the line and to determine the direction of the line before the line is actually drawn on the monitor screen.

(a) Calculations of Inclinations

Figure 10:
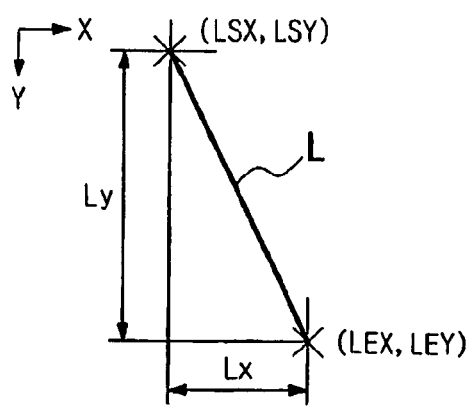
FIG. 10 shows an inclined line used for calculations regarding inclination and direction.

Suppose that as shown in FIG. 10, a line L is drawn from start-point coordinates (LSX,LSY) to end-point coordinates (LEX,LEY) with an X-axis inclination DX and a Y-axis inclination DY, which are calculated as follows:

$$DX=Lx/Ly=(LEX-LSX)/(LEY-LSY)$$

$$DY=Ly/Lx=(LEY-LSY)/(LEX-LSX)$$

Actually, the inclinations DX and DY are produced by calculating ΔX and ΔY as follows:

$$\Delta X=1/(LEX-LSX)$$

$$\Delta Y=1/(LEY-LSY)$$

where a plurality of inverse values regarding ΔX and ΔY are stored in a ROM in advance.

Using ΔX and ΔY, the following calculations are performed to produce DX and DY.

$$DX=(LEX-LSX)\times\Delta Y$$

$$DY=(LEY-LSY)\times\Delta X$$

(b) Determination of Directions

Figure 11:
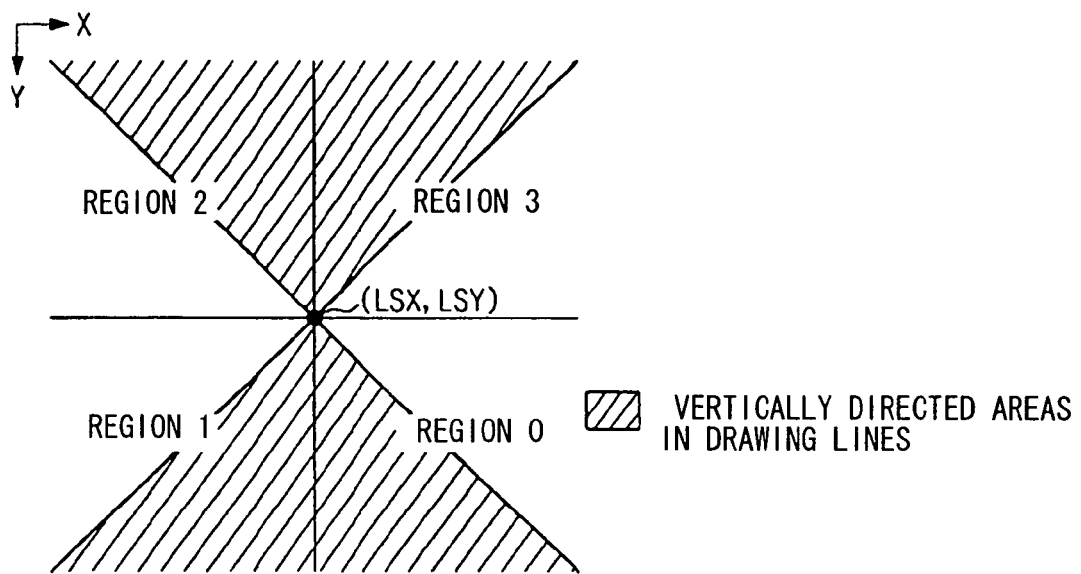
FIG. 11 shows a rectangular coordinates system for discriminating types of lines, which are started from the origin and are drawn in different directions.

Suppose that as shown in FIG. 11, the origin of the rectangular coordinates system is set as a start point of a line, which is drawn in a direction lying in any one of regions 0, 1, 2, and 3. In FIG. 11, slanted lines are drawn and inclined to the X-axis and Y-axis of the rectangular coordinates system by 45°, thus defining hatching areas and non-hatching areas. Herein, the line is referred to as a horizontally directed line when the end point thereof lies in the non-hatching areas; it is referred to as a vertically directed line when the end point thereof lies in the hatching areas; it is referred to as a horizontal line when the end point thereof lies on the X-axis; and it is referred to as a vertical line when the end point thereof lies on the Y-axis. Thus, different types of line drawing processing are performed with respect to different types of lines described above. Specifically, types of lines are discriminated by the following calculations.

|LEX−LSX|/|LEY−LSY|>1: horizontally directed line

|LEX−LSX|/|LEY−LSY|≦1: vertically directed line

LEX−LSX=0, LEY−LSY≠0: vertical line

LEX−LSX≠0, LEY−LSY=0: horizontal line

In the above, regions 0 to 3 are determined by the following inequalities.

LEX−LSX≧0, LEY−LSY≧0: region 0

LEX−LSX<0, LEY−LSY≧0: region 1

LEX−LSX<0, LEY−LSY<0: region 2

LEX−LSX≧0, LEY−LEY<0: region 3

(S5 to S7) Discrimination of Types of Lines

In accordance with the aforementioned calculations, types of lines are discriminated and are therefore subjected to the following steps respectively.

Vertically directed line→step S8
Horizontally directed line→step S9
Vertical line→step S10
Horizontal line→step S11

(S8) Drawing of Vertically Directed Line

Details of drawing of a vertically directed line will be described with reference to FIGS. 12 to 15.

(1) Calculation of Center Point XN of Line

Figure 12:
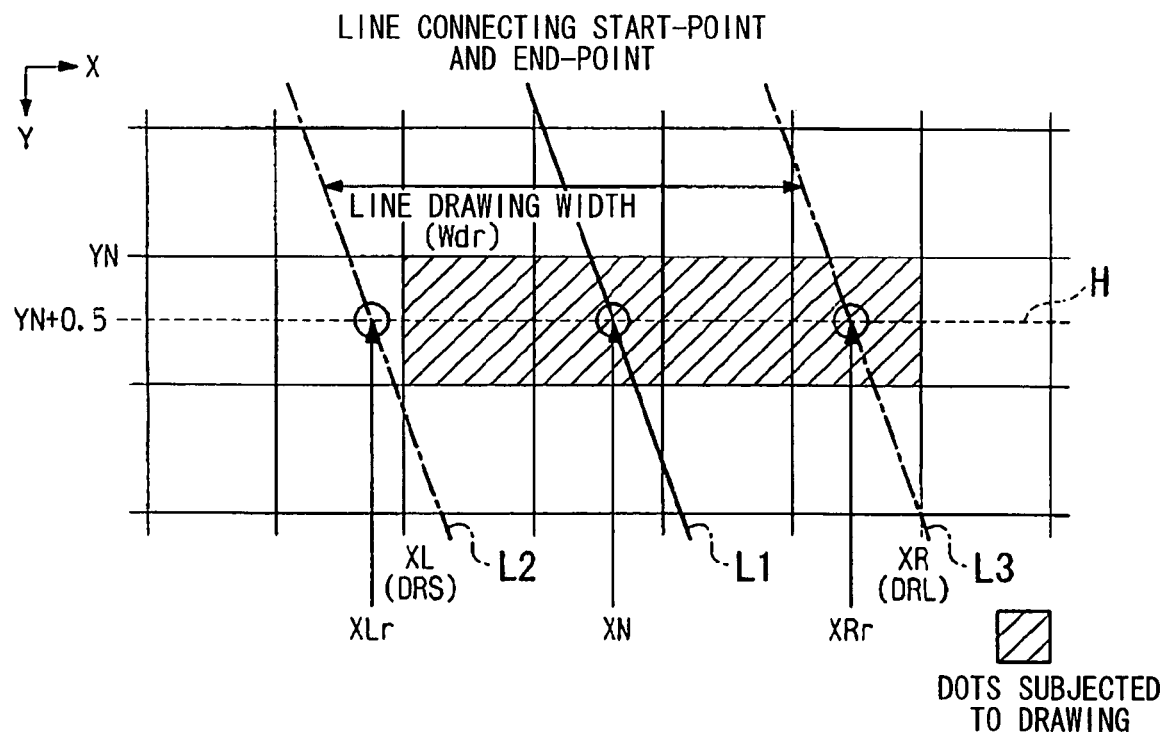
FIG. 12 shows a vertically directed line having a line drawing width displayed in relation to scanning lines.

Suppose that as shown in FIG. 12, a line L1 connecting between a start point and an end point is drawn to cross a scanning line H (where Y=YN+0.5) at a point whose X-coordinate XN is calculated by the following equations, which differ from each other with respect to types of widths, i.e., an odd-numbered width and an even-numbered width.

Odd-numbered width: $XN=(LSX+0.5)+\{(YN+0.5)-(LSY+0.5)\}\times DX$

Even-numbered width: $XN=LSX+\{(YN+0.5)-LSY\}\times DX$ (2) Calculation of Line Drawing Width Wdr A line drawing width Wdr is calculated based on the width LW of the line, which is determined in advance (see FIG. 6). This calculation is realized by reading appropriate values representing calculation results, which are stored in a ROM in advance.

$$Wdr=\text{round}(\sqrt{(1+|DX|^2)}\times LW, 0)$$

In the above, the function "round(A,0)" indicates rounding off to the nearest whole number.

(3) Calculations of Coordinates XLr, XRr

A left-side line L2 is drawn in the left side of the line L1 to cross the scanning line H at an X-axis coordinate XLr, and a right-side line L3 is drawn in the right side of the line L1 to cross the scanning line H at an X-axis coordinate XRr, wherein these coordinates are calculated as follows:

$$XLr=XN-Wdr/2$$

$$XRr=XN+Wdr/2$$

(4) Calculations of Limit Values XMAX, XMIN in X-Axis Line Drawing Range

Figure 13:
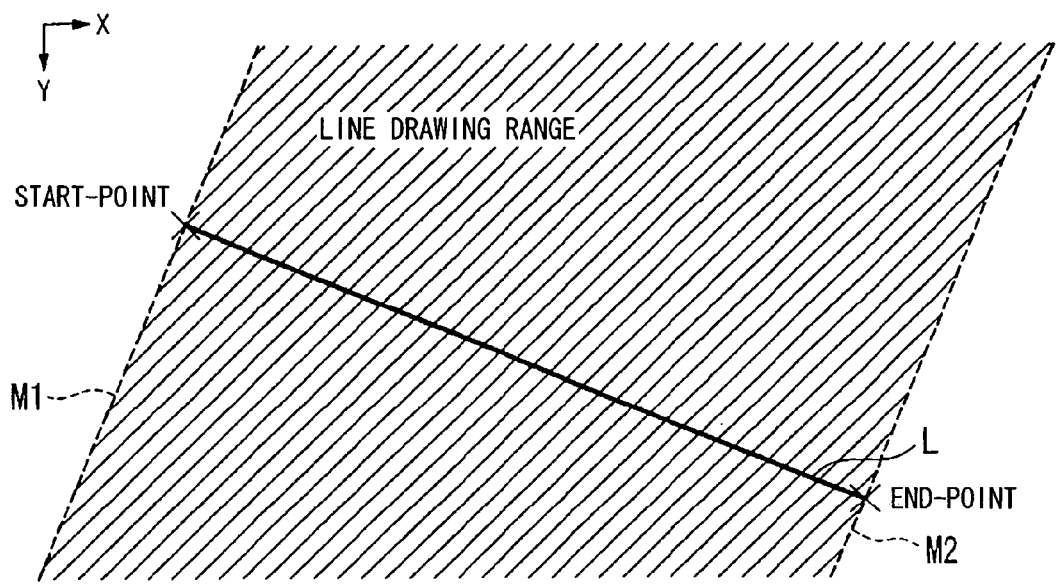
FIG. 13 shows a line drawing range with regard to a vertically directed line.

When the Y-axis coordinate YN of the scanning line H belongs to the aforementioned line terminating processing range (see step S2 shown in FIG. 8), limit values XMAX and XMIN are calculated with reference to the X-axis line drawing range, within which dots used for drawing the line are determined. This is called line terminating processing. As shown in FIG. 13, the X-axis line drawing range lies between lines M1 and M2, both of which are drawn perpendicular to the line L and which are drawn to pass the start point and end point of the line L respectively. The limit values XMAX and XMIN are produced by the following calculations.

Figure 14:
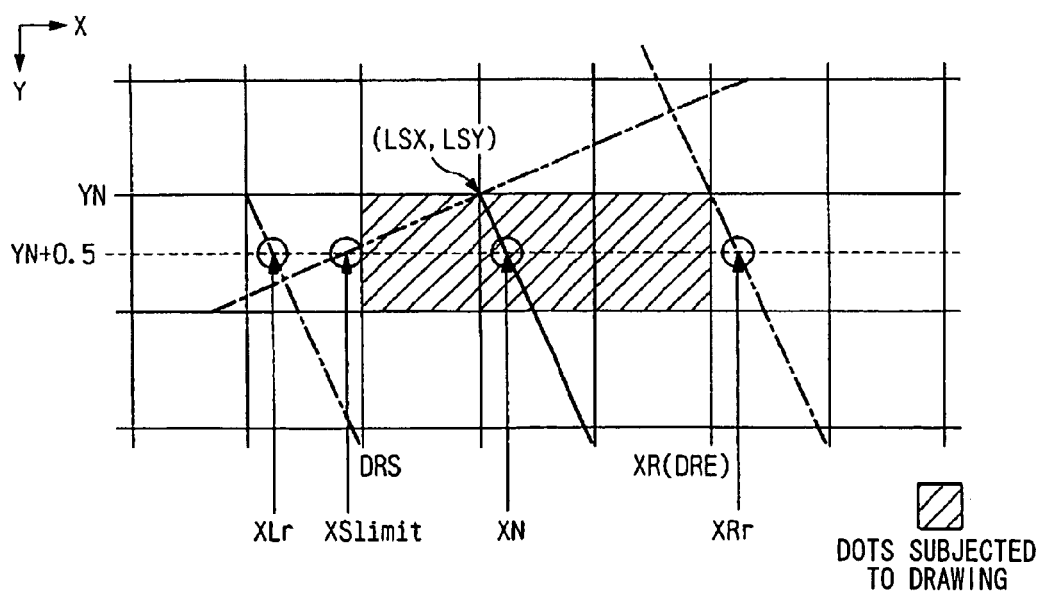
FIG. 14 shows a vertically directed line subjected to line terminating processing with regard to start-point coordinates.

First, as shown in FIG. 14, X-axis line drawing ranges XSlimit depending on the start-point coordinates (LSX, LSY) are calculated with respect to the odd-numbered width of line and the even-numbered width of line respectively.

Odd-numbered width: $XSlimit=(LSX+0.5)-\{(YN+0.5)-(LSY+0.5)\}\times DY$

Even-numbered width: $X\text{Slimit}=LSX-\{(YN+0.5)-LSY\}\times DY$

Figure 15:
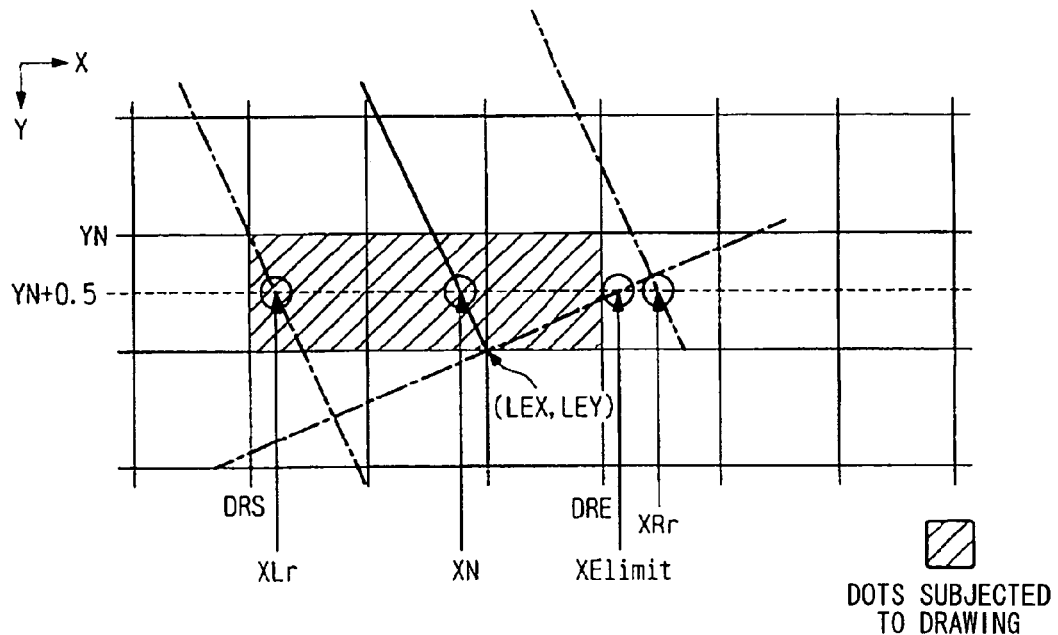
FIG. 15 shows a vertically directed line subjected to line terminating processing with regard to end-point coordinates.

Next, as shown in FIG. 15, X-axis line drawing ranges XElimit depending on the end-point coordinates (LEX, LEY) are calculated with respect to the odd-numbered width of line and the even-numbered width of line respectively.

Odd-numbered width: $X\text{Elimit}=(LEX+0.5)-\{(YN+0.5)-(LEY+0.5)\}\times DY$

Even-numbered width: $X\text{Elimit}=LEX-\{(YN+0.5)-LEY\}\times DY$

Thus, the limit values XMIN and XMAX can be directly determined using the X-axis line drawing ranges XSlimit and XElimit with respect to the regions 0 to 3 shown in FIG. 11 as follows:

Region 0: XMIN=XSlimit, XMAX=XElimit
Region 1: XMIN=XElimit, XMAX=XSlimit
Region 2: XMIN=XElimit, XMAX=XSlimit
Region 3: XMIN=XSlimit, XMAX=XElimit (5) Calculations of DRS and DRE By use of the aforementioned values XLr, XRr, XMIN, and XMAX, a line drawing start dot DRS and a line drawing end dot DRE are calculated as follows:

$DRS=\text{round}(\max(XLr, XMIN), 0)$ $DRE=\text{round}(\min(XRr, XMAX), 0)$ (6) Writing of Data into Line Buffers Designated line color data are written into line buffers at prescribed addresses corresponding to dots ranging from DRS to DRE (see hatching areas shown in FIGS. 14 and 15). Herein, writing is performed consecutively until one dot prior to DRE, so that DRE is not included in line drawing.

(S9) Drawing of Horizontal Directed Line

Next, line drawing processing regarding horizontally directed lines will be described with reference to FIG. 16.

(1) Calculation of Line Drawing Width Wdr

A line drawing width Wdr is calculated based on the width LW of the line, which is determined in advance. As to the horizontally directed line, the line drawing width Wdr lies perpendicular to the scanning line as shown in FIG. 16. This calculation is realized by reading calculation results, which are prepared in advance and are stored in a ROM.

$Wdr=\text{round}(\sqrt{(1+|DY|^2)}\times LW, 0)$ (2) Calculations of X-Axis Coordinates XLr and XRr at Left and Right Ends of Line X-axis coordinates XLr defining left ends of lines are calculated differently with respect to the odd-numbered width and even-numbered width of lines and with respect to regions, as follows:

(a) Regions 0, 2

Odd-numbered width: $XLr=(LSX+0.5)+\{(YN+0.5)-(LSY+0.5)-Wdr/2\}\times DX$

Even-numbered width: $XLr=LSX+\{(YN+0.5)-LSY-Wdr/2\}\times DX$ (b) Regions 1, 3

Odd-numbered width: $XLr=(LSX+0.5)+\{(YN+0.5)-(LSY+0.5)+Wdr/2\}\times DX$

Even-numbered width: $XLr=LSX+\{(YN+0.5)-LSY+Wdr/2\}\times DX$

X-axis coordinates XRr defining right ends of lines are calculated differently with respect to the odd-numbered width and even-numbered width of lines and with respect to regions, as follows:

(a) Regions 0, 2

Odd-numbered width: $XRr=(LSX+0.5)+\{(YN+0.5)-(LSY+0.5)+Wdr/2\}\times DX$

Even-numbered width: $XRr=LSX+\{(YN+0.5)-LSY+Wdr/2\}\times DX$ (b) Regions 1, 3

Odd-numbered width: $XRr=(LSX+0.5)+\{(YN+0.5)-(LSY+0.5)-Wdr/2\}\times DX$

Even-numbered width: $XRr=LSX+\{(YN+0.5)-LSY-Wdr/2\}\times DX$ (3) Calculations of Limit Values XMAX, XMIN The aforementioned calculations (described in item (4) regarding the drawing of vertically directed lines in (S8)) can be adapted to produce limit values XMAX and XMIN in X-axis line drawing ranges with regard to the drawing of horizontally directed lines.

(4) Calculations of DRS and DRE

The aforementioned calculations (described in item (5) regarding the drawing of vertically directed lines in (S8)) can be adapted to produce a line drawing start dot DRS and a line drawing end dot DRE with regard to the drawing of horizontally directed lines.

(5) Writing of Data into Line Buffers

Figure 16:
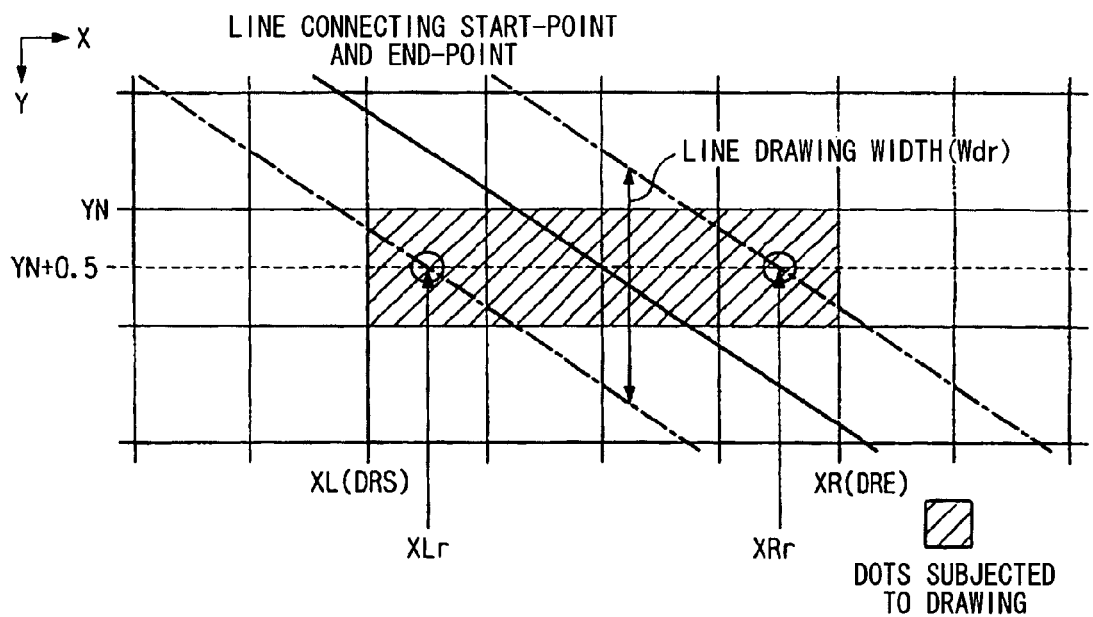
FIG. 16 shows a horizontally directed line subjected to line drawing processing.

Designated line color data are written into line buffers at prescribed addresses corresponding to dots ranging from DRS to DRE, which is shown in the hatching area in FIG. 16. Herein, writing is performed consecutively until one dot prior to DRE, so that DRE is not included in line drawing. When DRS≧DRE, no data is written into line buffers.

(S10) Drawing of Vertical Line

Next, line drawing processing regarding vertical lines (where LEX−LSX=0, LEY−LSY≠0) will be described below.

(1) Calculation of Y-Axis Line Drawing Range

As to the drawing of vertical lines, Y-axis line drawing ranges differ from those adapted to the drawing of other types of lines, wherein limit values Ymin and Ymax are calculated only with respect to the prescribed condition of Ymin≦YN<Ymax, and they are calculated differently with respect to the odd-numbered width and even-numbered width of lines, as follows:

Odd-numbered width: $Y\min=\min(LSY, LEY)+1$ $Y\max=\max(LSY, LEY)+1$

Even-numbered width: $Y\min=\min(LSY, LEY)$ $Y\max=\max(LSY, LEY)$ (2) Calculations of DRS and DRE A line drawing start dot DRS and a line drawing end dot DRE are calculated differently with respect to the odd-numbered width and even-numbered width of lines, as follows:

Odd-numbered width: $DRS=LSX+0.5-LW/2$ $DRE=LSX+0.5+LW/2$

Even-numbered width: $DRS=LSX-LW/2$ $DRE=LSX+LW/2$ (3) Writing of Data into Line Buffers Designated line color data are written into line buffers at addresses corresponding to dots ranging from DRS to DRE. Herein, writing is consecutively performed until one dot prior to DRE, so that DRE is not included in line drawing.

(S11) Drawing of Horizontal Line

Next, line drawing processing regarding horizontal lines (where LEX−LSX≠0, LEY−LSY=0) will be described below.

(1) Calculations of DRS and DRE

A line drawing start dot DRS and a line drawing end dot DRE are calculated differently with respect to the odd-numbered width and even-numbered width of lines, as follows:

Odd-numbered width: $DRS=\min(LSX, LEX)+1$ $DRE=\max(LSX, LEX)+1$

Even-numbered width: $DRS=\min(LSX, LEX)$ $DRE=\max(LSX, LEX)$ (2) Writing of Data into Line Buffers Designated line color data are written into line buffers at addresses corresponding to dots ranging from DRS to DRE. Herein, writing is consecutively performed until one dot prior to DRE, so that DRE is not included in the line drawing.

The aforementioned description is related to the line drawing processing (see step Sa2). Next, start-point circle drawing processing (see step Sa4) will be described with reference to FIGS. 17A and 17B; and end-point circle drawing processing (see step Sa6) will be described with reference to FIGS. 18A and 18B.

Each of the start-point circle drawing processing and end-point circle drawing processing is executed basically by three steps, namely, (E-1) decision as to whether or not scanning lines YN belong to circle drawing ranges, (E-2) calculation of X-axis circle drawing range, and (E-3) determination of dots.

Figure 17A:
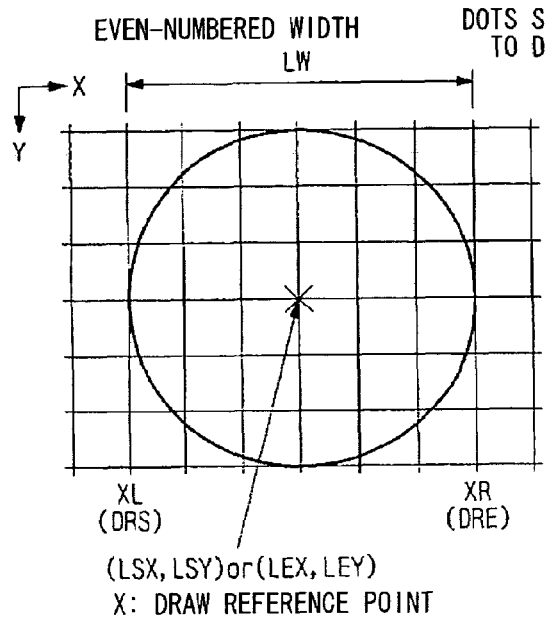
FIG. 17A shows a circle drawn at a start-point terminal or an end-point terminal of a line having an even-numbered width.
Figure 17B:
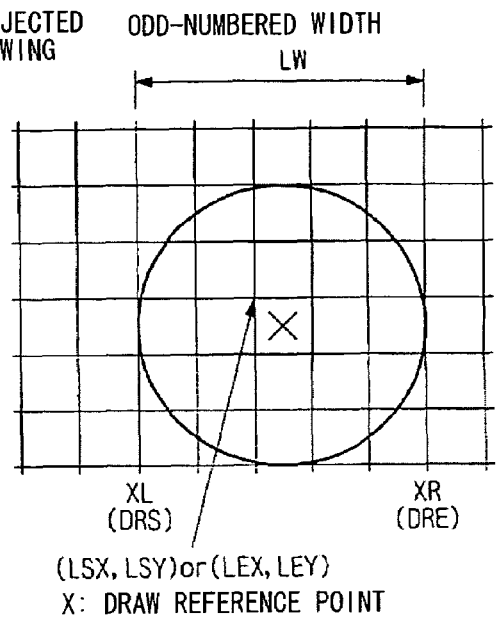
FIG. 17B shows a circle drawn at a start-point terminal or an end-point terminal of a line having an odd-numbered width.

(E-1) Decision as to Whether or Not Scanning Lines YN Belong to Circle Drawing Ranges Each of the center of a start-point circle and the center of an end-point circle is set differently with respect to the odd-numbered width and even-numbered width of lines being drawn on the grid of the monitor screen. With respect to the even-numbered width of line as shown in FIG. 17A, the center of a circle lies on the line of the grid. With respect to the odd-numbered width of line as shown in FIG. 17B, the center of a circle lies at an intermediate position between adjacent lines on the grid. That is, Y-axis circle drawing ranges are calculated differently with respect to the odd-numbered width and even-numbered width of lines, wherein they are basically calculated by the aforementioned calculations regarding Y-axis line drawing ranges in the line terminating processing, as follows:

Odd-numbered width:

$LSY+0.5-LW/2 \leq YN < LSY+0.5+LW/2$ (Y-Axis Circle Drawing Range for a Start-Point Circle)

$LEY+0.5-LW/2 \leq YN < LEY+0.5+LW/2$ (Y-Axis Circle Drawing Range for an End-Point Circle)

Even-numbered width:

$LSY-LW/2 \leq YN < LSY+LW/2$ (Y-axis circle drawing range for a start-point circle)

$LEY-LW/2 \leq YN < LEY+LW/2$ (Y-axis circle drawing range for an end-point circle)

(E-2) Calculations of X-Axis Circle Drawing Ranges

X-axis circle drawing ranges are calculated differently with respect to the odd-numbered width and even-numbered width of lines as shown in FIGS. 17A and 17B, wherein X-axis coordinates XL of leftmost dots DRS and X-axis coordinates XR of rightmost dots DRE are calculated as follows:

(a) Calculations of X-Axis Coordinates of Leftmost Dots DRS

Odd-numbered width: $XL=LSX+0.5-LW/2$ $XR=LSX+0.5+LW/2$

Figure 18A:
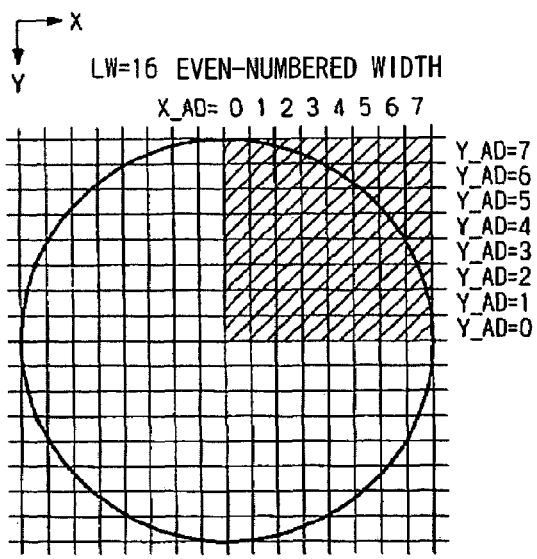
FIG. 18A shows stored data regarding a circle, which is drawn at a start-point terminal or an end-point terminal of a line having an even-numbered width.
Figure 18B:
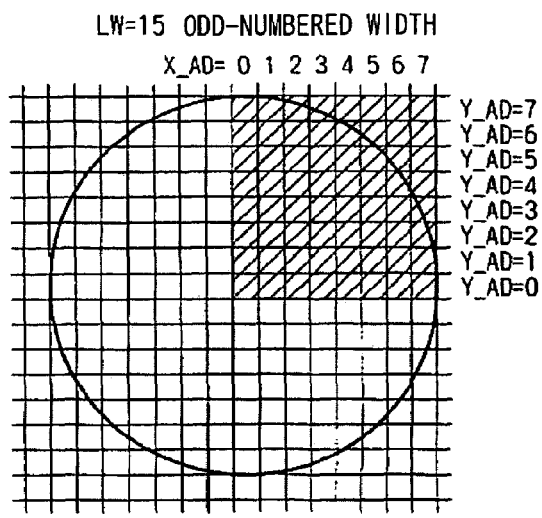
FIG. 18B shows stored data regarding a circle, which is drawn at a start-point terminal or an end-point terminal of a line having an odd-numbered width.
Figure 19:
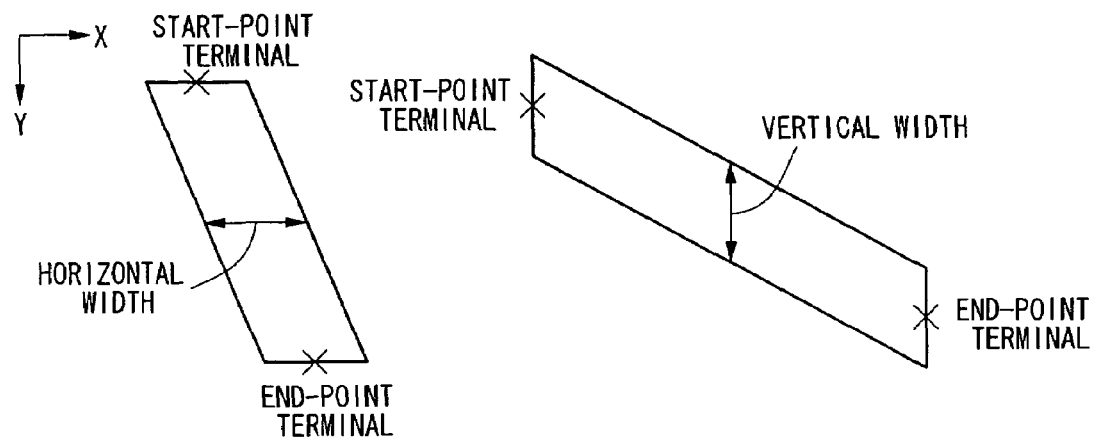
FIG. 19 show lines whose widths lie in parallel with or perpendicular to horizontal scanning lines displayed on a monitor screen.
Figure 20:
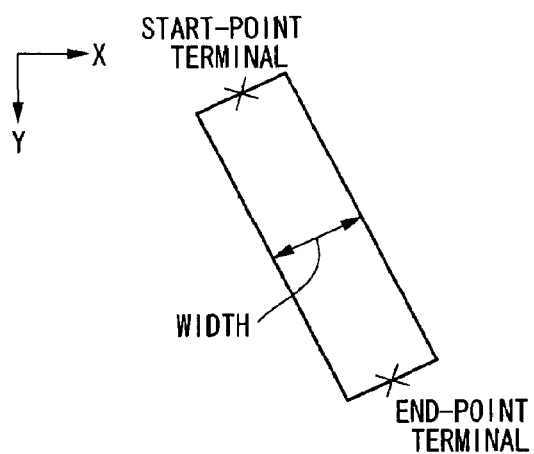
FIG. 20 shows a line whose start-point terminal and end-point terminal lie in a length direction thereof.

Even-numbered width: $XL=LSX-LW/2$ $XR=LSX+LW/2$ (b) Calculations of X-Axis Coordinates of Rightmost Dots DRE Odd-numbered width: $XL=LEX+0.5-LW/2$ $XR=LEX+0.5+LW/2$ Even-numbered width: $XL=LEX-LW/2$ $XR=LEX+LW/2$ (E-3) Determination of Dots The grid of the monitor screen is divided into a plurality of rectangular segments (e.g., dots each having a unit width) encompassed by line segments as shown in FIGS. 18A and 18B, wherein the total number of segments arranged horizontally within a circle is counted to determine the width of the line, which is either an even-numbered width or an odd-numbered width. Circle drawing data are created in advance with respect to segment 1-16 and are stored in a ROM.

Next, circle drawing data stored in the ROM will be described with reference to FIGS. 18A and 18B, wherein FIG. 18A shows that the width LW of the line is "16" (i.e., sixteen segments) representing an even-numbered width, and FIG. 18B shows that the width LW of the line is "15" (i.e., fifteen segments) representing an odd-numbered width. The ROM stores circle drawing data with regard to only a quarter portion of a circle, wherein "1" is set to each of addresses belonging to the circle, while "0" is set to each of addresses not belonging to the circle. Such 1-bit data is specified and read from the ROM upon the designation of a pair of an Y-axis address Y_AD and an X-axis address X_AD. In the case of LW=16 (see FIG. 18A), for example, "1" is read from the ROM upon the designation of a Y-axis address Y_AD=3 and an X-axis address X_AD=3 so that the corresponding dot is subjected to drawing, while "0" is read from the ROM upon the designation of a Y-axis address Y_AD=6 and an X-axis address X_AD=6 so that the corresponding dot is not subjected to drawing.

Next, calculations regarding the Y-axis address Y_AD and the X-axis address X_AD will be described below.

(a) Calculations of Y-Axis Addresses Y_AD

Y-axis addresses of the ROM are calculated based on coordinates YN of scanning lines. Herein, Y-axis addresses are calculated differently with respect to the odd-numbered width and even-numbered width of lines, as follows:

(i) Calculations Regarding Start-Point Circles

Odd-numbered width: $Y\_AD=abs(YN-LSY)$

Even-numbered width: $Y\_AD=INT(abs(YN+0.5-LSY))$ (ii) Calculations Regarding End-Point Circles Odd-numbered width: $Y\_AD=abs(YN-LEY)$ Even-numbered width: $Y\_AD=INT(abs(YN+0.5-LEY))$ In the above, the function "abs(A)" produces an absolute value of 'A'; and the function "INT(A)" produces an integer of "A".

(b) Calculations Regarding X-Axis Addresses X_AD

Prescribed dots ranging from DRS to DRE, which are calculated with respect to the X-axis circle drawing range, are subjected to circle drawing processing. First, X-axis addresses X_AD of the ROM are calculated with regard to coordinates XN regarding dots subjected to circle drawing processing, wherein they are calculated differently with respect to the odd-numbered width and even-numbered width of lines, as follows:

(i) Calculations Regarding Start-Point Circles

Odd-numbered width: $X\_AD=abs(XN-LSX)$

Even-numbered width: $X\_AD=INT(abs(XN+0.5-LSX))$ (ii) Calculations Regarding End-Point Circles Odd-numbered width: $X\_AD=abs(XN-LEX)$ Even-numbered width: $X\_AD=INT(abs(XN+0.5-LEX))$ Prescribed data (i.e., "1" and "0") are read from the ROM based on Y-axis addresses Y_AD and X-axis addresses X_AD, which are calculated as described above, wherein color codes representing the color of a line are written with respect to dots corresponding to "1", and they are not written with respect to other dots corresponding to "0".

The present embodiment uses the ROM for storing a plurality of 1-bit data at respective addresses used for the execution of circle drawing processing. Of course, it is possible to modify the present embodiment such that the ROM stores a plurality of multi-bit data at respective addresses. This makes it possible to realize alpha (α) blending in circle drawing processing. According to the alpha blending, it is possible to display prescribed images (e.g., lines and circles) with composite colors merging into background images on the monitor screen. For example, when a plurality of 4-bit data are stored in the ROM, it is possible to perform alpha blending in the following sixteen stages represented by the binary notation of 4-bit data, in which "C" denotes color codes of a circle, and "B" denotes color codes of a background image.

| (Binary notation of 4-bit data) | (Alpha blending operation) |
|---|---|
| 0000 | C × 15/16 + B × 0/16 |
| 0001 | C × 15/16 + B × 1/16 |
| ... | ... |
| 1111 | C × 1/16 + B × 15/16 |

Incidentally, circle drawing processing not using alpha blending is performed as follows:

| (Binary notation of 4-bit data) | (Circle drawing data) |
|---|---|
| "0000" to "0111" | Color codes of a circle |
| "1000" to "1111" | No drawing |

The aforementioned alpha blending can be applied to antialiasing with regard to outer peripheries of circles. Antialiasing is a technique for eliminating irregularities or stairstep appearances of slanted lines or curves at their boundaries on computer displays that display images using dots. Antialiasing can be realized by performing alpha blending on boundaries of circles, which are displayed using dots. In the Case of LW=16 shown in FIG. 18A, for example, 1-bit data corresponding to "1" is stored in the ROM with regard to a Y-axis address Y_AD=1 and an X-axis address X_AD=7. In consideration of the inner-circle area ratio of the dot, which is expressed as "15:1" (i.e., the dot has an inner circle area rated "15" and an outer circle area rated "1"), for example, 4-bit data whose binary notation is "0001" is stored in the ROM with regard to the aforementioned addresses. In this case, the dot is displayed by use of color data, which is expressed as "C×15/16+B×1/16". Similar adjustments can be made with regard to other dots along the outer periphery of a circle. Thus, dots belonging to a circle drawn on the monitor screen is displayed in such a way that each dot having a high inner-circle area ratio is emphasized in the color of the circle, while each dot having a low inner-circle area ratio is emphasized in the color of the background image. As a result, it is possible to reduce irregularities or stairstep appearances on the outer periphery of a circle drawn on the monitor screen.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A method for drawing a line having a prescribed width on the basis of a start-point coordinate of the line, an end-point coordinate of the line, and the prescribed width of the line on a screen of a display apparatus by using data regarding dots aligned on scanning lines displayed on the screen, said method comprising the steps of:

calculating a drawing range in a vertical direction of the screen required for drawing the line having the prescribed width to be drawn on the basis of the start-point coordinate of the line, the end-point coordinate of the line and the prescribed width of the line, a terminal of the line to be drawn being formed of a perpendicular line which is perpendicular to a direction of the line to be drawn, wherein the drawing of the line is not performed outside of the drawing range in the vertical direction;

calculating coordinates of intersections between the scanning lines and boundaries of the line to be drawn;

selecting dots constituting the line to be drawn on scanning lines on the basis of the calculated coordinates of the intersections:

writing data regarding the selected dots on the scanning lines into a line buffer; and displaying the line to be drawn having the prescribed width and the terminal on the screen by using the data written into the line buffer.

2. The method according to claim 1 wherein a way of calculating coordinates of the intersections is different depending upon an inclination of the line to be drawn.

3. A method for drawing a line having a prescribed width on the basis of a start-point coordinate of the line, an end-point coordinate of the line, and the prescribed width of the line on a screen of a display apparatus by using at data regarding dots aligned on scanning lines displayed on the screen, said method comprising the steps of:

calculating a drawing range in a vertical direction of the screen required for drawing the line having the prescribed width to be drawn on the basis of the start-point coordinate of the line, the end-point coordinate of the line, and the prescribed width of the line, a terminal of the line to be drawn being formed of a perpendicular line which is perpendicular to a direction of the line to be drawn, wherein the drawing of the line is not performed outside of the drawing range in the vertical direction;

calculating an inclination of the line based on the start-point coordinate and the end-point coordinate;

when the inclination of the line ranges from 45° to 135° against each of the scanning lines, calculating center coordinates at which a scanning line intersects with a center of the line so as to produce a scanning-direction length of the line based on the calculated inclination of the line and the width of the line, thus calculating coordinates of intersections between the scanning lines and boundaries of the line on the basis of the center coordinates and the scanning-direction length of the line;

when the inclination of the line ranges from 0° to 45° or ranges from 135° to 180°, calculating a scanning-perpendicular direction length of the line based on the calculated inclination of the line and the width of the line, thus calculating coordinates of intersections between the scanning lines and boundaries of the line on the basis of the start-point coordinates, the calculated inclination of the line, the scanning-perpendicular direction length and coordinates of scanning lines;

selecting dots constituting the line to be drawn on the scanning lines on the basis of the calculated coordinates of the intersections;

writing data regarding the selected dots on the scanning lines into a line buffer; and displaying the line to be drawn having the prescribed width and the terminal on the screen by using the data written into the line buffer.

4. The method according to claim 3 further comprising the steps of:

making a decision as to whether or not line terminating processing is performed on at least one terminal of the line displayed on the screen; and in the line terminating processing, calculating limit values for dots displayed on the screen on the basis of at least one of the start-point coordinate and the end-point coordinate of the line, whereby the dots ranging between the limit values are written into the line buffer so as to prevent other dots not ranging between the limit values from being written into the line buffer.

5. An apparatus for drawing a line having a prescribed width on the basis of a start-point coordinate of the line, an end-point coordinate of the line, and the prescribed width of the line on a screen of a display apparatus by using data regarding dots aligned on scanning lines displayed on the screen, said apparatus comprising:

a line buffer;

a first calculation section for calculating a drawing range in a vertical direction of the screen required for drawing the line having the prescribed width to be drawn on the basis of the start-point coordinate of the line, the end-point coordinate of the line and the prescribed width of the line, a terminal of the line to be drawn being formed of a perpendicular line which is perpendicular to a direction of the line to be drawn, wherein the drawing of the line is not performed outside of the drawing range in the vertical direction;

a controller for issuing an instruction to draw the line on the screen with respect to the drawing range;

a second calculation section for calculating coordinates of intersections between the scanning lines and boundaries of the line to be drawn in response to the instruction from the controller;

a selecting section for selecting dots constituting the line to be drawn on scanning lines on the screen on the basis of the calculated coordinates of the intersections;

a write section for writing data regarding the selected dots on the scanning lines into the line buffer; and an output section for outputting the data written into the line buffer to the display apparatus for displaying the line to be drawn having the prescribed width and the terminal on the screen.

6. The apparatus according to claim 5 wherein a way of calculating coordinates of the intersections is different depending upon an inclination of the line to be drawn.

7. An apparatus for drawing a line having a prescribed width on the basis of a start-point coordinate of the line, an end-point coordinate of the line, and the prescribed width of the line on a screen of a display apparatus by using data regarding dots aligned on scanning lines displayed on the screen, said apparatus comprising:

a line buffer a calculation section for calculating a drawing range in a vertical direction of the screen required for drawing the line having the prescribed width to be drawn on the basis of the start-point coordinate of the line, the end-point coordinate of the line and the prescribed width of the line, a terminal of the line to be drawn being formed of a perpendicular line which is perpendicular to a direction of the line to be drawn, wherein the drawing of the line is not performed outside of the drawing range in the vertical direction;

a controller for issuing an instruction to draw the line on the screen with respect to the drawing range;

a second calculation section for calculating an inclination of the line based on the start-point coordinate and the end-point coordinate in response to the instruction from the controller;

a third calculation section for when the inclination of the line ranges from 45° to 135° against each of the scanning lines, calculating center coordinates at which a scanning line intersects with a center of the line so as to produce a scanning-direction length of the line based on the calculated inclination of the line and the width of the line, thus calculating coordinates of intersections between the scanning lines and boundaries of the line on the basis of the center coordinates and the scanning-direction length of the line;

a fourth calculation section for when the inclination of the line ranges from 0° to 45° or ranges from 135° to 180°, calculating a scanning-perpendicular direction length of the line based on the calculated inclination of the line and the width of the line, thus calculating coordinates of intersections between the scanning lines and boundaries of the line on the basis of the start-point coordinate, the calculated inclination of the line, the scanning-perpendicular direction length and coordinates of scanning lines;

a selecting section for selecting dots constituting the line to be drawn on the scanning lines on the basis of the calculated coordinates of the intersections;

a writing section for writing data regarding the selected dots on the scanning lines into the line buffer; and an output section for outputting the data written into the line buffer to the display apparatus for displaying the line to be drawn having the prescribed width and the terminal on the screen.

8. The apparatus according to claim 7 further comprising:

a decision section for making a decision as to whether or not line terminating processing is performed on at least one terminal of the line displayed on the screen; and a fifth calculation section for in the line terminating processing, calculating limit values for dots displayed on the screen on the basis of at least one of the start-point coordinate and the end-point coordinate of the line, whereby the dots ranging between the limit values are written into the line buffer so as to prevent other dots not ranging between the limit values from being written into the line buffer.

\* \* \* \* \*